(12) United States Patent
Akemakou et al.

(10) Patent No.: US 6,271,613 B1
(45) Date of Patent: Aug. 7, 2001

(54) ROTATING MACHINE, SUCH AS MOTOR VEHICLE ALTERNATOR

(75) Inventors: Dokou Akemakou, Vitry sur Seine; Eric Pelle, Maisons Alfort, both of (FR)

(73) Assignee: Valeo Equipment Electriques Moteur, Creteil (FR)

( * ) Notice: Subject to any disclaimer, the term of this patent is extended or adjusted under 35 U.S.C. 154(b) by 0 days.

(21) Appl. No.: 09/486,464

(22) PCT Filed: Jun. 25, 1999

(86) PCT No.: PCT/FR99/01534

§ 371 Date: Feb. 25, 2000

§ 102(e) Date: Feb. 25, 2000

(87) PCT Pub. No.: WO99/67871

PCT Pub. Date: Dec. 29, 1999

(30) Foreign Application Priority Data

Jun. 25, 1998 (FR) .................................................. 98 08073
Feb. 25, 1999 (FR) .................................................. 99 02345

(51) Int. Cl.$^7$ ........................... H02K 21/00; H02K 21/04
(52) U.S. Cl. .......................... 310/181; 310/156; 310/261; 310/269
(58) Field of Search .................................. 310/181, 162, 310/216, 91, 269, 261, 264; 29/596–598

(56) References Cited

U.S. PATENT DOCUMENTS

| | | | |
|---|---|---|---|
| 4,188,554 | 2/1980 | Binns ................................... | 310/156 |
| 4,339,874 | 7/1982 | McCarty et al. ....................... | 29/596 |
| 5,091,668 | 2/1992 | Cuenot et al. ........................ | 310/156 |
| 5,157,297 | * 10/1992 | Uchida ................................. | 310/156 |
| 5,162,686 | * 11/1992 | Royer .................................. | 310/156 |
| 5,334,899 | * 8/1994 | Skybyk ................................ | 310/268 |
| 5,378,953 | * 1/1995 | Uchida et al. ........................ | 310/156 |
| 5,663,605 | * 9/1997 | Evans et al. ......................... | 310/181 |
| 5,753,989 | * 5/1998 | Syverson et al. ..................... | 310/114 |
| 6,072,257 | * 6/2000 | Akemakou ............................ | 310/191 |

FOREIGN PATENT DOCUMENTS

| | | |
|---|---|---|
| 40 33 454 | 4/1992 | (DE) . |
| 0 431 514 | 6/1991 | (EP) . |
| 96/30992 | 10/1996 | (WO) . |

OTHER PUBLICATIONS

Patent Abstracts of Japan, vol. 018, No. 635, Dec. 5, 1994 & JP 06 245419, Sep. 2, 1994.

Binns et al., "Choice of parameters in the hybrid permanent–magnet synchronous motor", Proceedings of the Institution of Electrical Engineers, vol. 126, No. 8, Mar. 1979, pp. 741–744.

International Search Report dated Oct. 1, 1999.

* cited by examiner

Primary Examiner—Tran Nguyen
(74) Attorney, Agent, or Firm—Morgan & Finnegan, LLP

(57) ABSTRACT

An electric machine such as an alternator for a motor vehicle is provided. The machine includes a stator and a rotor, the stator having at least one secondary winding received in at least one pair of slots. The rotor has at least two successive excitation magnets which generate two magnetic fluxes in the rotor and has components in opposite tangential directions around the structure of the rotor. The rotor has an even number of slots between the two magnets. The slots define projecting poles between them and receive winding legs that are suitable for being powered to co-operate with the magnets to define alternating poles. Each of the slots that receives the winding legs is occupied only by a single leg or by a plurality of legs wound around the same projecting pole. The shaft of the rotor is made of a magnetic material. The machine includes at least one non-magnetic zone in the vicinity of the shaft and in the vicinities of the magnets, which non-magnetic zone minimizes flux leakage towards the shaft of the rotor.

13 Claims, 6 Drawing Sheets

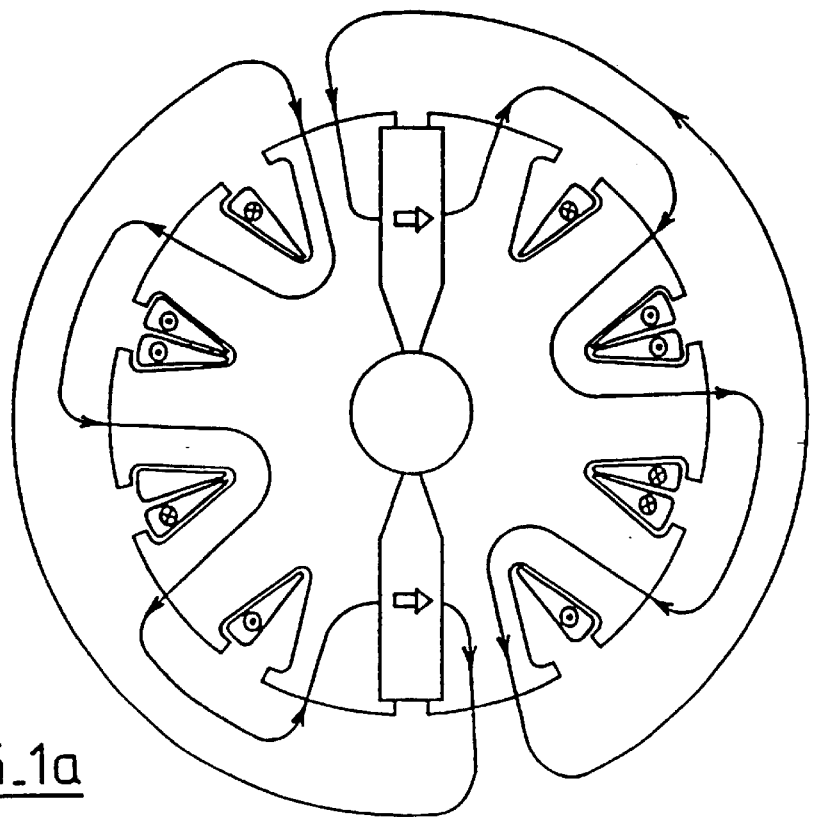
FIG_1a
PRIOR ART
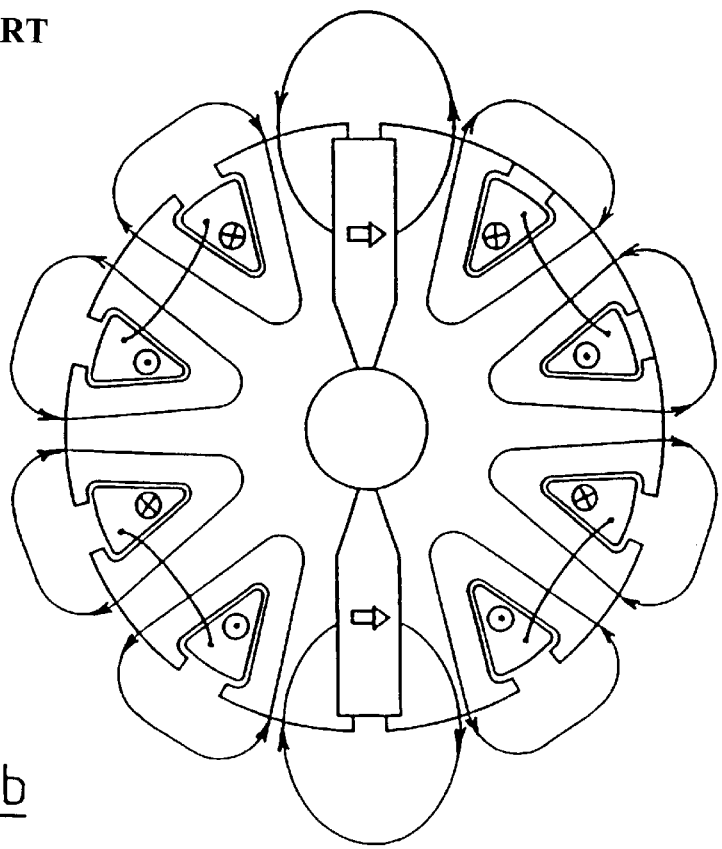
FIG_1b

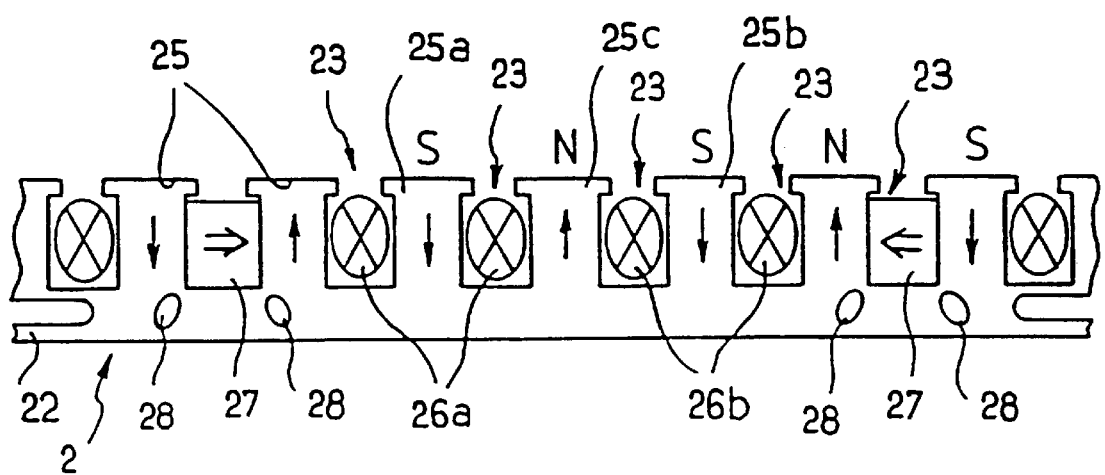
FIG_5

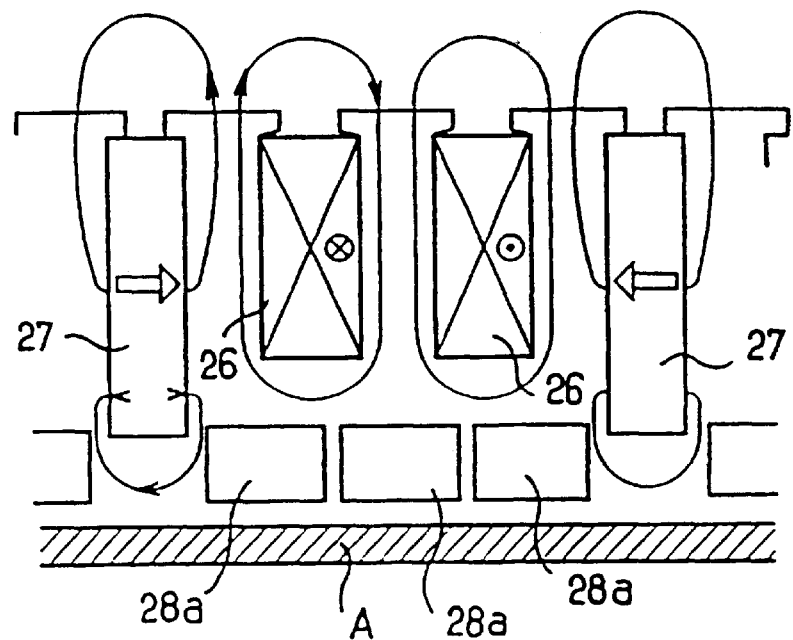
FIG_6
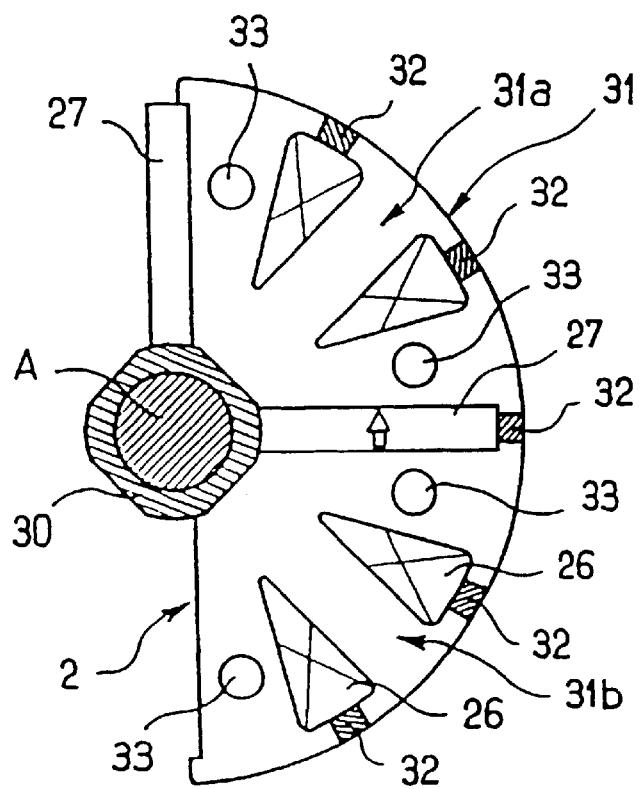
FIG_7

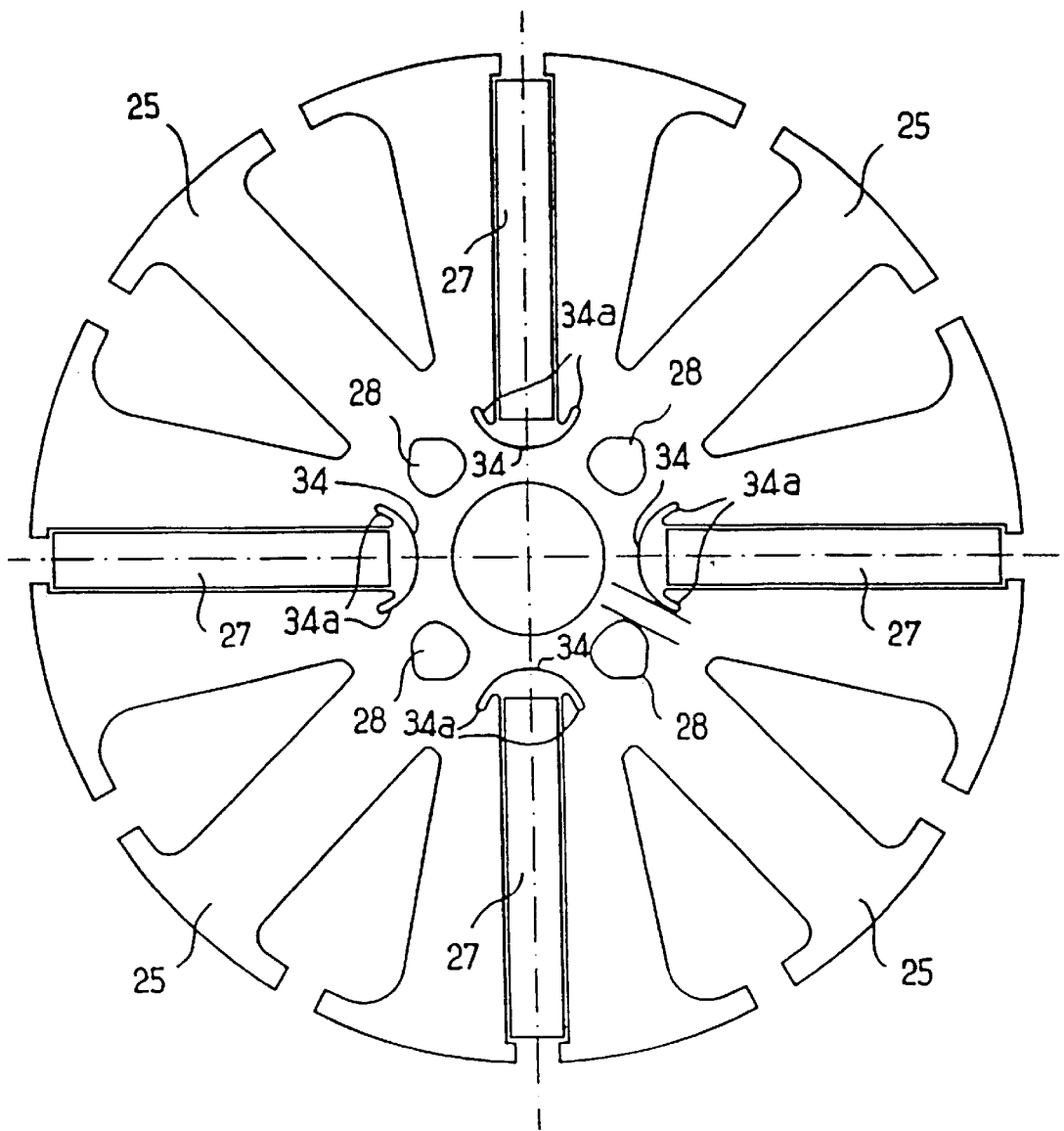
FIG_8

ROTATING MACHINE, SUCH AS MOTOR VEHICLE ALTERNATOR

BACKGROUND OF THE INVENTION

The present invention relates generally to rotary machines such as alternators for motor vehicles.

The single-phase or multi-phase generator constituted by a conventional motor vehicle alternator generally comprises a stator inside which there rotates a rotor provided with an excitation winding. The winding is powered by brushes in contact with two slip rings provided on a projecting portion of the shaft of the rotor.

Rotary machines are already known, in particular from EP-A-0 707 374, in which, in particular to increase their efficiency, the rotor excitation field is provided both by permanent magnets and by windings (this may be referred to as "combined" excitation), and in which the current delivered by the secondary is controlled by commutator means at the excitation windings, which commutator means make it possible selectively to reverse the excitation direction so as to reduce the flux from the permanent magnets or even make it substantially zero.

The need to reverse the excitation current direction makes it necessary to use an H-shaped semiconductor switching bridge whose cost is high and which thus pushes up the cost of the machine.

Electric motor structures are also known, in particular from FIG. 19 of Patent Application WO96/30992, in which the rotor is provided with:

at least two successive permanent excitation magnets which, in the rotor, generate two magnetic fluxes having components extending tangentially around the rotor structure in opposite directions in the direction of rotor movement; and an even number of slots between the excitation magnets, together with windings that are wound in said slots and that are suitable for being powered in a full excitation direction or in a reverse direction so as to define alternating poles between said slots.

Those machines are not fully satisfactory insofar as slots between the magnets receive legs from two successive windings, each winding occupying only one half of the volume of a slot.

The fact that each slot between the magnets receives legs from two successive windings makes it necessary for the slots directly adjacent to the magnets to be filled only half-full. The ampère-turn distribution is thus asymmetrical in the slots of the wound poles; the slots directly adjacent to the magnets receive, in absolute terms, only one half of the absolute value of the ampère-turns received by the other slots.

That magnetic asymmetry modifies the usual distribution of the magnetic field lines (compared with wound machines having projecting poles, the machines have magnets only), thereby giving rise to premature saturation in the yoke or requiring the yoke to be over-dimensioned.

That is what is illustrated in FIG. 1a which shows a machine of the type proposed in Patent Application WO96/30992, together with the lines on which the magnetic fluxes are looped when the windings in the slots of the rotor are powered in their full excitation direction.

BRIEF SUMMARY OF THE INVENTION

An object of the invention is to mitigate that drawback.

In the Applicant's Patent Application FR 98 02886 (which, it should be noted, is not part of the state of the art to be taken into account when determining the inventive step of the invention), the Applicant has already proposed an alternator whose secondary current is regulated by acting on the excitation of powered rotor coils.

The structure described in that patent application is of the type shown in FIGS. 1b, 2a, and 2b. It comprises a stator 1 and a rotor 2.

The stator 1 has a frame 12 defining an annular structure whose inside periphery is provided with a plurality of slots 13 which are defined between poles 15 of the rotor and which receive secondary winding legs 14.

Throughout the present text the term "leg" is used to designate an assembly comprising the various portions of the turns of the same winding that are received together in the same slot.

The rotor 2 has a frame 22 in which a plurality of slots 23 are also provided, which slots define poles 25 and receive both permanent magnets 27 whose flux lines are oriented tangentially around the rotor structure, and excitation winding legs 26.

The following are thus found in succession in the adjacent slots 23 of the rotor:

a magnet 27 having a first polarity;

two legs of a winding 26 wound on a pole 25 and received in two adjacent slots;

a second magnet 27 having a second polarity opposite from the first polarity; and two legs of a winding 26 that are suitable for passing currents in directions opposite to the directions of the currents flowing through the legs of the preceding winding 26, etc.

For example, the rotor and the stator may have the same number of poles, e.g. 12.

With such a structure, in the absence of current in the legs 26, the rotor adopts a polarity pattern such as . . . S-N-N-N-S-S-S-N-N-N, etc. (FIG. 2a).

Thus, in the absence of current through the windings 26, the N-S polarity pattern has a pitch that is equal to three times the pitch of the teeth (poles 25) of the rotor and the energy transferred between the rotor and the stator is at a minimum.

In contrast, when a current flows through the windings of the rotor, the polarities of said rotor then become . . . N-S-N-S-N-S, etc. with a pitch that corresponds to the pitch of the teeth of the rotor; the magnetic energy that is transferred between the stator and the rotor is higher, and it increases with increasing excitation current.

FIGS. 1b and 2b show the lines along which the flux loops when the legs are powered in the excitation direction. As shown clearly in these figures, each of the flux lines loops through two successive poles.

FIG. 2a shows flux lines in the absence of excitation current.

In order to limit magnetic flux leakage and in order to prevent the flux of the magnets from looping along the shaft of the machine, FR 98 02 886 proposes making the shaft of the rotor of a non-magnetic material and shaping said shaft and the laminations of the rotor so as to keep the thickness of the frame beneath the magnets as small as possible.

Unfortunately, the use of non-magnetic materials (e.g. titanium) can give rise to large extra manufacturing costs.

Furthermore, mechanical strength constraints prevent the thickness of the frame between the magnets and the shaft of the rotor from being kept as small as would be desirable.

Another object of the invention is to mitigate those drawbacks.

The invention provides an electric machine comprising a stator and a rotor, the stator having at least one secondary winding received in at least one pair of slots, the rotor having at least two successive excitation magnets which generate two magnetic fluxes in the rotor and having components in opposite tangential directions around the structure of the rotor, said rotor having an even number of slots between said two magnets, which slots define projecting poles between them and receive winding legs that are suitable for being powered to co-operate with the magnets to define alternating poles, said electric machine being characterized in that each of the slots that receives the winding legs is occupied only by a single leg or by a plurality of legs wound around the same projecting pole, and in that the shaft of the rotor is made of a magnetic material, said machine including at least one non-magnetic zone in the vicinity of said shaft and in the vicinities of said magnets, which non-magnetic zone minimizes or eliminates flux leakage towards the shaft of the rotor.

In particular, in a preferred embodiment, the frame of the rotor is provided with a plurality of holes which extend in the vicinity of the shaft of the rotor, and which are distributed between the magnets, said holes constituting non-magnetic zones which define constriction areas on either side of each of the magnets, thereby limiting flux leakage to the shaft.

In yet another embodiment, the shaft has a non-magnetic covering which constitutes a spacer separating it from the magnets.

Advantageously, each of the laminations that makes up the frame of the rotor is made up of n independent sectors that are angularly juxtaposed, where n is the number of permanent magnets, means being provided to hold said sectors relative to one another.

Such a machine advantageously also has the various following characteristics taken singly or in any possible combination:

each of the slots that receive the magnets is terminated at its end that is nearest to the rotor by an enlarged opening of curved shape;

such an end opening has a shape that presents folded-over portions on either side of the magnet received in the slot that it terminates; and the edges of the holes and of the slots of the rotor that receive the magnets are substantially parallel over a certain portion.

BRIEF DESCRIPTION OF THE DRAWINGS

Other characteristics and advantages of the invention appear from the following description. This description is given merely by way of non-limiting illustration. It should be read with reference to the accompanying drawings, in which:

FIG. 1a (examined above) is a diagrammatic section view of the rotor of a machine of the type proposed in Patent Application WO96/30992;

FIG. 1b (examined above) is a diagrammatic section view of the rotor of a machine of the type described in Patent Application FR 98 02886;

FIG. 5 is a diagrammatic view similar to the FIG. 2 view, showing another possible embodiment of the invention;

FIG. 6 is a diagrammatic developed view of the rotor of another possible embodiment of a machine of the invention;

FIG. 7 is a diagrammatic cross-section view of the rotor of another possible embodiment of a machine of the invention; and FIG. 8 is a diagrammatic cross-section view of a rotor of another particularly advantageous embodiment of the invention.

DETAILED DESCRIPTION OF THE INVENTION

Figure 3:
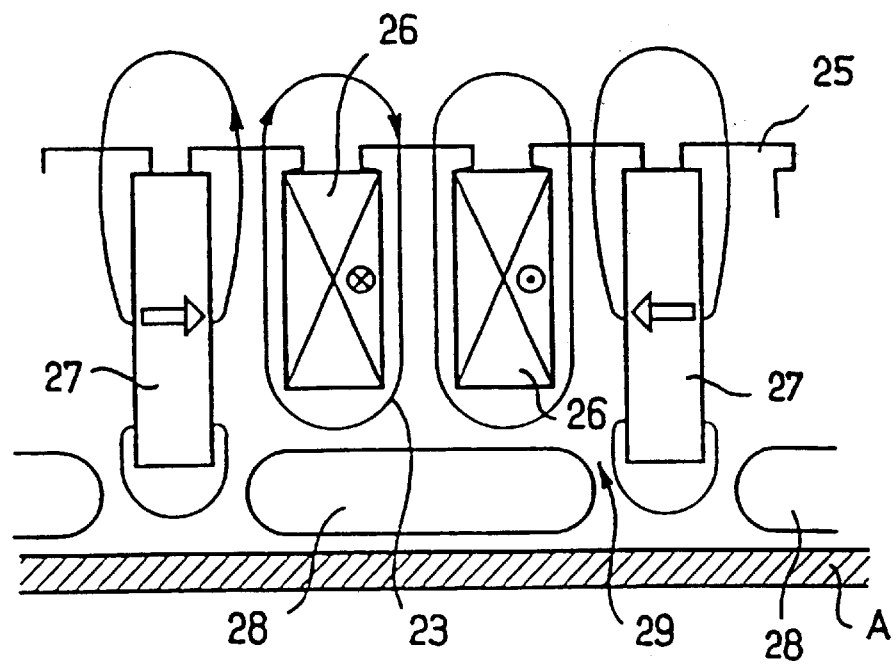
FIG. 3 is a diagrammatic developed view of the rotor of a possible embodiment of a machine of the invention.
Figure 4:
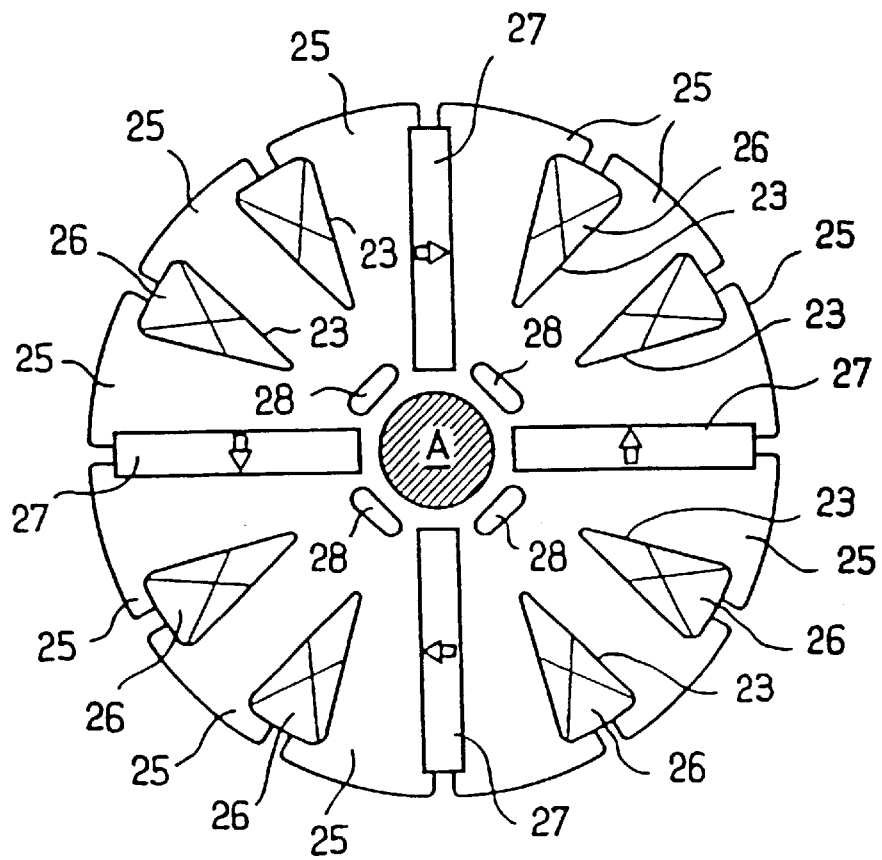
FIG. 4 is a cross-section view of the rotor of the machine shown in FIG. 2.

The machine whose rotor is shown in FIGS. 3 and 4 has a single-phase stator that is analogous to the stator of the machine shown in FIG. 1 (and which is not shown so as not to overload the figures), or a multi-phase stator. It also includes a rotor 2 which, in the same way as the rotor of the machine shown in FIG. 1, has a frame that is cylindrical in overall shape and that is provided with a plurality of slots 23 which are separated by teeth or projecting poles 25 and which receive permanent magnets 27 alternating with pairs of legs of an excitation winding 26.

More particularly, the permanent magnets 27 are distributed with alternating polarity around the periphery of the rotor 2, the flux generated by any two successive magnets 27 having components extending tangentially around the rotor structure that are opposite in the travel direction of the rotor 2.

In the excited state, the winding of the rotor is powered in one direction only so that the flux generated by the current flowing through the two legs between two successive permanent magnets 27 opposes the flux from said magnets 27. It is thus possible to go from an N-N-N-S-S-S, etc. polarity in the absence of excitation to a N-S-N-S, etc. polarity when the winding 26 of the rotor is excited in a given direction. FIG. 3 shows the directions of the excitation currents and of the fluxes generated by the currents flowing through the legs of the winding 26.

Furthermore, if the windings are powered in the reverse direction, it is possible to reduce the electromotive force of the stator or even to make it zero with a polarity $N_1 N_2 N_1 S_1 S_2 S_1$ where $N_1$ and $N_2$ (and respectively $S_1$ and $S_2$) correspond to different flux intensities with $N_1 + N_1 = -S_2$ and $N_2 = -(S_2 + S_2)$.

Variant embodiments in which the number of slots between two successive magnets is an even number greater than two are naturally conceivable.

In any event, whether the number of slots between two magnets is two or more, each slot 23 is occupied by the leg of a single winding, the number of windings 26 between two magnets being equal to (or less than) one half of the number of slots between said magnets.

Thus, in the example shown in FIG. 5, two successive magnets 27 are separated by four slots 23. Two windings 26a, 26b are wound between said magnets 27. The windings 26a, 26b are wound on poles 25a, 25b on either side of an intermediate magnet 25c, each slot 23 therefore being occupied by a single leg only.

With structures of the type of those that are described above, the flux distribution obtained is without magnetic asymmetry. Flux is well concentrated on each pole when the windings are powered, and leakage flux from one pole to another is eliminated or at least limited. This makes it possible to obtain power operation that is not possible with machines of the type presented in WO96/30992.

In addition, in the embodiments shown in FIGS. 2 to 4, the shaft of the rotor, referenced A, is a cylindrical shaft made of a magnetic material, e.g. steel.

In the embodiment shown in FIGS. 3 and 4, the frame is provided with four oblong holes 28 which extend in the vicinity of the shaft A of the rotor and which are distributed between the magnets 27.

In the embodiment shown in FIG. 5, holes 28 are provided that extend in the vicinity of the magnets 27 on either side thereof. More precisely, the holes 28 present shapes that are slightly elongate in directions that extend on slants towards the shaft A between the edges of said magnets 27 and the middle zones of the poles 25 on either side of said magnets 27.

The holes 28 constitute non-magnetic zones which define constriction areas 29 on either side of the magnets 27, which constriction areas limit leakage of flux towards the shaft A. The thickness of the lamination under the magnet can then be large without adversely affecting the electrical performance of the machine.

Figure 2A:
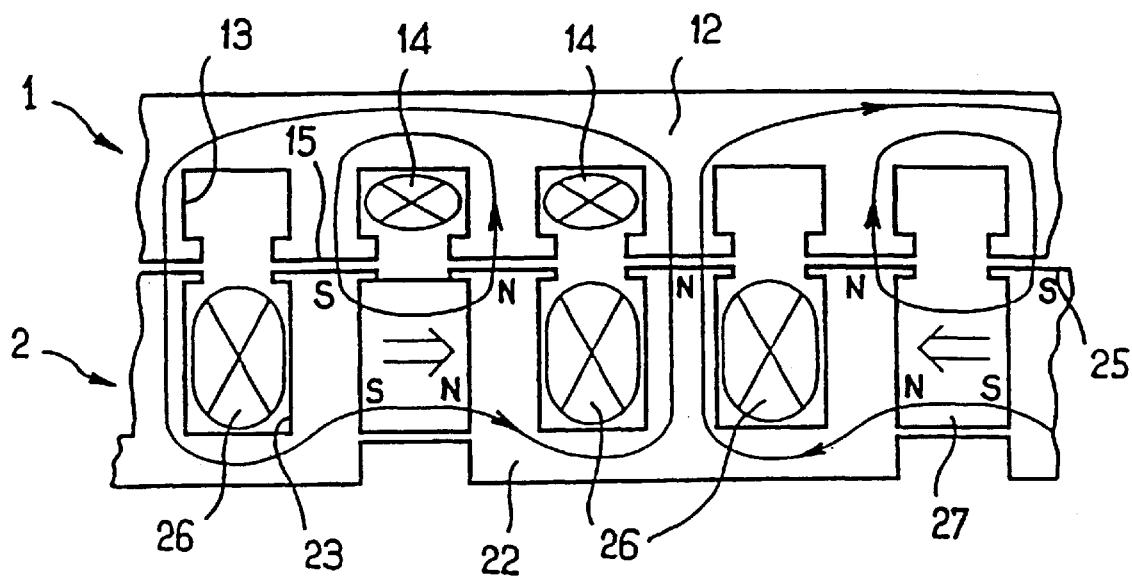
FIGS. 2a and 2b (examined above) are diagrammatic developed views of the rotor and of the stator of the same machine, showing the flux lines in the absence or in the presence of excitation on the windings of the rotor.
Figure 2B:
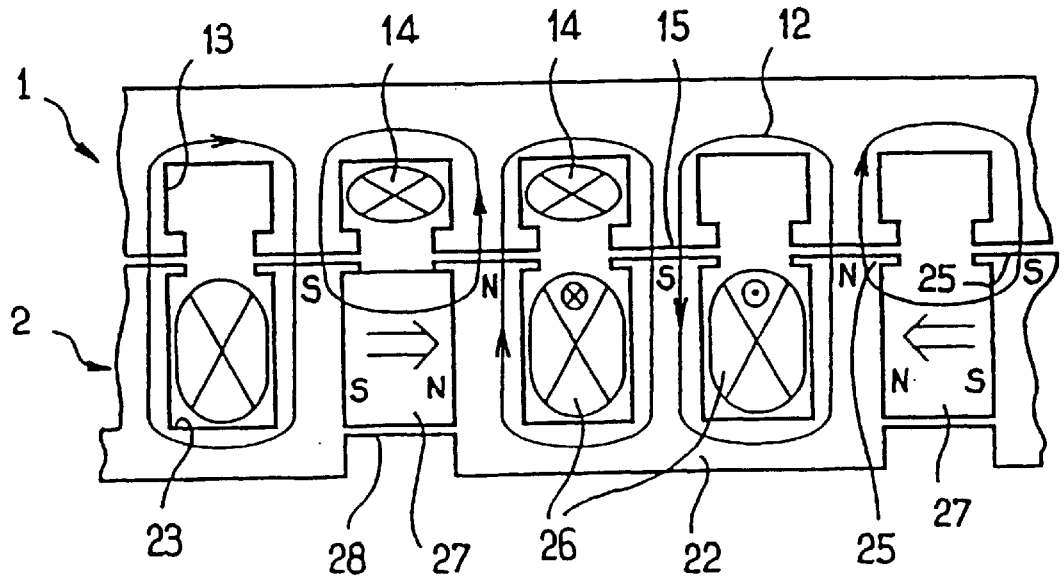

Furthermore, the mechanical strength of such a structure is greater than the mechanical strength of a structure of the type shown in FIGS. 2a and 2b. In particular, the thicker zone under the magnet, and the constriction zone 29 between a hole 28 and a magnet 27 contribute more effectively to securing any one "sector" of lamination relative to an immediately adjacent sector. This does not apply to the low-thickness constriction zone under a magnet of a structure of the type of the structure shown in FIGS. 2a and 2b, which zone can break when the rotor rotates at high speeds.

The ends of the holes 28 are preferably rounded. Rectangular shapes may however be considered for said holes 28.

In a variant, in order to increase further the mechanical strength of the structure, it is possible to replace an oblong hole 28 between two successive magnets 27 by a plurality of holes 28a (e.g. two, three, or four holes). This is shown in FIG. 6.

The width between a hole 28a and the adjacent hole 28a or the magnet 27 with which it is juxtaposed is such that the resulting constriction areas are suitable for limiting the leakage of flux towards the shaft A of the rotor.

In the embodiment shown in FIG. 7, a non-magnetic material is interposed between firstly the magnetic shaft A and secondly the magnets 27 and the laminations 31 of the frame. For example, the magnetic shaft A may carry a covering 30 of a non-magnetic material (resin) all around its periphery, which covering defines a spacer that separates said shaft A from the magnets 27. In a variant, it may be fitted into a tube, e.g. made of aluminum. On its outside, the spacer may be provided with flats defining dovetails to which the sheets 31 are fixed, and it may be provided with dovetail shoulders which help hold the laminations firmly.

In both cases, the laminations 31 that constitute the frame of the rotor 2 are then constituted by n independent sectors 31a, 31b, etc. that are juxtaposed angularly, where n is the number of permanent magnets, the slots 23 receiving the magnets 27 being defined by the facing shapes of two successive sectors 31a, 31b, etc. The sectors 31a, 31b, etc. constitute teeth or poles of the rotor.

In the absence of dovetail-forming elements, the sectors 31a, 31b, etc. are held by overmolding 32 a non-magnetic resin, for example, or else by end plates made of a non-magnetic material, which end plates co-operate with magnetic tie rods 33 passing through the laminations.

As shown in FIG. 7, these two means may be used simultaneously.

As can be understood from the above, a structure of the type shown in FIG. 7 enables the problems of flux leaking to the shaft A to be solved completely, and makes it possible to avoid the mechanical strength problems that can arise with structures of the type shown in FIGS. 2a and 2b.

Naturally, the present invention is also applicable to alternators performing other functions such as the function of starting the engine of a motor vehicle. Such an alternator may then be referred to as a "starter alternator".

Reference is made below to the embodiment shown in FIG. 8.

In this particularly advantageous embodiment, each of the slots of the magnets 27 is terminated at its end nearer to the axis of the rotor by an enlarged opening 34 that is generally curved in shape and that folds over on either side of the body of the corresponding magnet 27. In FIG. 8, these folded-over portions are referenced 34a.

The edges of the opening 34 that terminate the folded-over portions 34a are rounded.

The curvature and rounded shape of the end opening 34 prevents tears from being started.

The folded-over portions 34a on either side of each of the magnets make it possible to optimize the field lines thereof. Thus, the shear forces are removed, and only traction forces remain. These traction forces impart good mechanical strength during centrifuging.

In addition, the portions of the edges of the openings 34 and the portions of the holes 28 that face them directly are substantially parallel.

Thus, the constriction zones defined between said end openings 34 and the holes 28 are substantially in the form of bars with parallel edges.

The stress concentrations are thus minimized.

As can be understood from the above, such a configuration makes it possible to optimize mechanical strength on centrifuging.

What is claimed is:

1. An electric machine comprising a stator and a rotor, the stator having at least one secondary winding received in at least one pair of slots, the rotor having at least two successive excitation magnets which generate two magnetic fluxes in the rotor and having components in opposite tangential directions around the rotor, said rotor having an even number of slots between said two magnets, which slots define projecting poles between them and receive winding legs that are suitable for being powered to co-operate with the magnets to define alternating poles, wherein each of the slots that receives the winding legs is occupied only by a single leg or by a plurality of legs wound around the same projecting pole, and wherein the rotor has a shaft that is made of a magnetic material, said machine including at least one non-magnetic zone in the vicinity of said shaft and in the vicinities of said magnets, which non-magnetic zone minimizes flux leakage towards the shaft of the rotor, wherein each of the slots that receive the magnets is terminated at an end that is nearest to the rotary shaft by an enlarged opening of curved shape.

2. An electric machine comprising a stator and a rotor, the stator having at least one secondary winding received in at least one pair of slots, the rotor having at least two successive excitation magnets which generate two magnetic fluxes in the rotor and having components in opposite tangential directions around the rotor, said rotor having an even number of slots between said two magnets, which slots define projecting poles between them and receive winding legs that are suitable for being powered to co-operate with the magnets to define alternating poles, wherein each of the slots that receives the winding legs is occupied only by a single leg or by a plurality of legs wound around the same projecting pole, and wherein the rotor has a shaft that is made of a magnetic material, said machine including at least one non-magnetic zone in the vicinity of said shaft and in the vicinities of said magnets, which non-magnetic zone minimizes flux leakage towards the shaft of the rotor, wherein each of the slots that receive the magnets is terminated at an end that is nearest to the rotary shaft by an enlarged opening of curved shape, wherein said enlarged opening has a shape that presents folded-over portions on either side of the magnet received in the slot that it terminates.

3. An electric machine comprising a stator and a rotor, the stator having at least one secondary winding received in at least one pair of slots, the rotor having at least two successive excitation magnets which generate two magnetic fluxes in the rotor and having components in opposite tangential directions around the rotor, said rotor having an even number of slots between said two magnets, which slots define projecting poles between them and receive winding legs that are suitable for being powered to co-operate with the magnets to define alternating poles, wherein each of the slots that receives the winding legs is occupied only by a single leg or by a plurality of legs wound around the same projecting pole, and wherein the rotor has a shaft that is made of a magnetic material, said machine including at least one non-magnetic zone in the vicinity of said shaft and in the vicinities of said magnets, which non-magnetic zone minimizes flux leakage towards the shaft of the rotor.

4. A machine according to claim 3, wherein the rotor has a frame including a plurality of holes which extend in the vicinity of the shaft of the rotor, and which are distributed between the magnets, said holes constituting non-magnetic zones which define constriction areas on either side of each of the magnets, thereby limiting flux leakage to the shaft.

5. A machine according to claim 4, wherein between two successive magnets, it is provided with a single hole which is oblong in shape.

6. A machine according to claim 4, comprising a plurality of successive holes between two magnets.

7. A machine according to claim 4, wherein the edges of the holes and of the slots of the rotor that receive the magnets are substantially parallel over a certain portion.

8. A machine according to claim 3, wherein a non-magnetic tubular spacer is interposed between that shaft and the magnets.

9. A machine according to claim 8, wherein the frame of the rotor includes laminations each being made up of n independent sectors that are angularly juxtaposed, where n is the number of permanent magnets, the machine further including means to hold said sectors relative to one another.

10. A machine according to claim 9, wherein the non-magnetic spacer comprises a covering carried by the shaft.

11. A machine according to claim 9, wherein the spacer has dovetail shoulders.

12. A machine according to claim 9, wherein said means comprise end plates made up of a non-magnetic material, said end plates co-operating with magnetic tie rods passing through the laminations.

13. A machine according to claim 1 which comprises an alternator for a motor vehicle.

* * * * *

UNITED STATES PATENT AND TRADEMARK OFFICE
CERTIFICATE OF CORRECTION

PATENT NO.    : 6,271,613 B1
DATED         : August 7, 2001
INVENTOR(S)   : Akemakou et al.

It is certified that error appears in the above-identified patent and that said Letters Patent is hereby corrected as shown below:

<u>Title page,</u>
Item [73], Assignee, "Valeo Equipment Electriques Moteur, Creteil (FR)" should read -- Valeo Equipements Electriques Moteur, Creteil (FR) --

Signed and Sealed this

Thirteenth Day of August, 2002

*Attest:*

*Attesting Officer*

JAMES E. ROGAN
*Director of the United States Patent and Trademark Office*